US011778646B2

(12) United States Patent
Zhang et al.

(10) Patent No.: US 11,778,646 B2
(45) Date of Patent: Oct. 3, 2023

(54) FULL DUPLEX TCI INDICATION UNDER UNIFIED TCI FRAMEWORK

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/359,077

(22) Filed: Jun. 25, 2021

(65) Prior Publication Data

US 2022/0417932 A1 Dec. 29, 2022

(51) Int. Cl.
*H04W 72/53* (2023.01)
*H04L 5/14* (2006.01)
*H04W 80/02* (2009.01)
*H04W 72/0446* (2023.01)
*H04W 72/23* (2023.01)

(52) U.S. Cl.
CPC ........... *H04W 72/53* (2023.01); *H04L 5/1423* (2013.01); *H04W 72/0446* (2013.01); *H04W 72/23* (2023.01); *H04W 80/02* (2013.01)

(58) Field of Classification Search
CPC . H04W 72/53; H04W 72/0446; H04W 72/23; H04W 80/02; H04L 5/1423; H04B 7/02
See application file for complete search history.

(56) References Cited

U.S. PATENT DOCUMENTS

| 2021/0314953 | A1* | 10/2021 | Park | H04L 5/0053 |
| 2021/0337547 | A1* | 10/2021 | Rahman | H04L 5/0048 |
| 2022/0124782 | A1* | 4/2022 | Park | H04B 7/088 |
| 2022/0225362 | A1* | 7/2022 | Yi | H04W 72/23 |
| 2022/0225369 | A1* | 7/2022 | Park | H04L 5/0053 |
| 2022/0264475 | A1* | 8/2022 | Yi | H04W 72/046 |

OTHER PUBLICATIONS

3GPP TSG RAN WG1 Meeting #105-e; R1-2104205, e-Meeting, May 19-May 27, 2021; Source: Futurewei, Title: Enhancement on multi-beam operation. (Year: 2021).*
3GPP TSG RAN WG1 #104-e; R1-2101005, e-Meeting, Jan. 25-Feb. 5, 2021; Source: Nokia, Nokia Shanghai Bell, Title: Enhancements on Multi-beam Operation (Year: 2021).*

(Continued)

*Primary Examiner* — Mohammed S Chowdhury
(74) *Attorney, Agent, or Firm* — Sevan Savsa; ArentFox Schiff LLP

(57) ABSTRACT

A user equipment may be configured to implement full duplex transmission configuration indication (TCI) in a unified TCI framework. In some aspects, the user equipment may receive, from a base station, a plurality of TCI states, the plurality of TCI states including a full duplex TCI state corresponding to at least two channels for a first transmission link type and at least one channel for a second transmission link type. Further, the user equipment may apply the full duplex TCI state in accordance with a determined application time.

26 Claims, 9 Drawing Sheets

(56) References Cited

OTHER PUBLICATIONS

3GPP TSG RAN WG1 #104-e; R1-2101092, e-Meeting, Jan. 25-Feb. 5, 2021; Source: Xiaomi ; Title: Enhancements on multi-beam operation. (Year: 2021).*

3GPP TSG RAN WG1 #104-e; R1-2101186; e-Meeting, Jan. 25-Feb. 5, 2021; Source: Samsung; Title: Multi-beam enhancements. (Year: 2021).*

3GPP TSG RAN WG1 Meeting #104-e; R1-2100208, E-meeting, Jan. 25-Feb. 5, 2021, Source: Huawei, HiSilicon; Title: Enhancements on multi-beam operation (Year: 2021).*

3GPP TSG RAN WG1 #104-e ; R1-2101644; e-Meeting, Jan. 25-Feb. 5, 2021; Source: TCL; Title: Enhancements on Multi-Beam Operation (Year: 2021).*

3GPP TSG RAN WG1 #104-e ; R1-2100421 , e-Meeting, Jan. 25-Feb. 5, 2021; Source: vivo; Title: Further discussion on multi beam enhancement (Year: 2021).*

\* cited by examiner

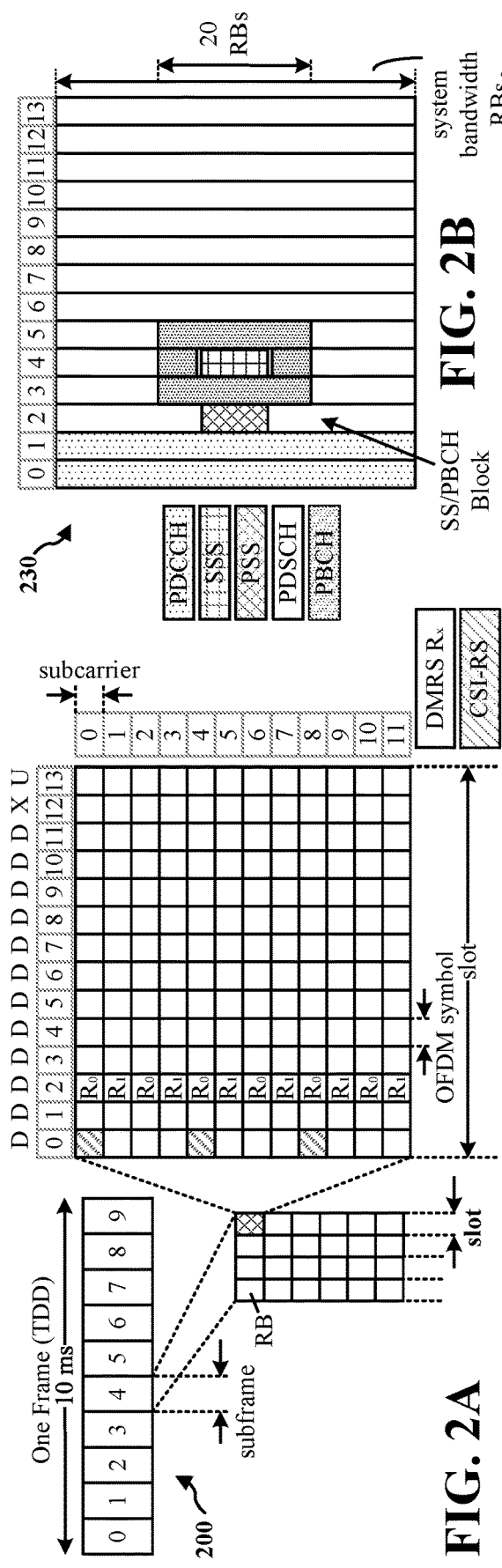
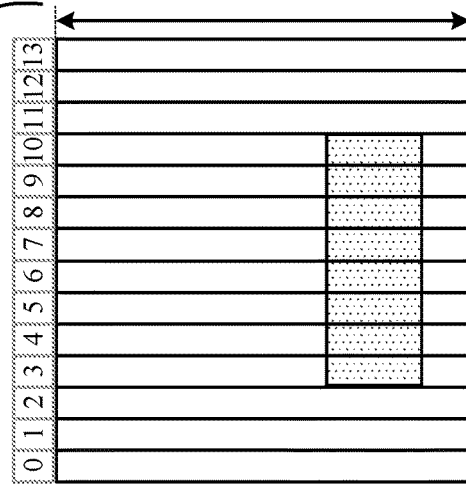
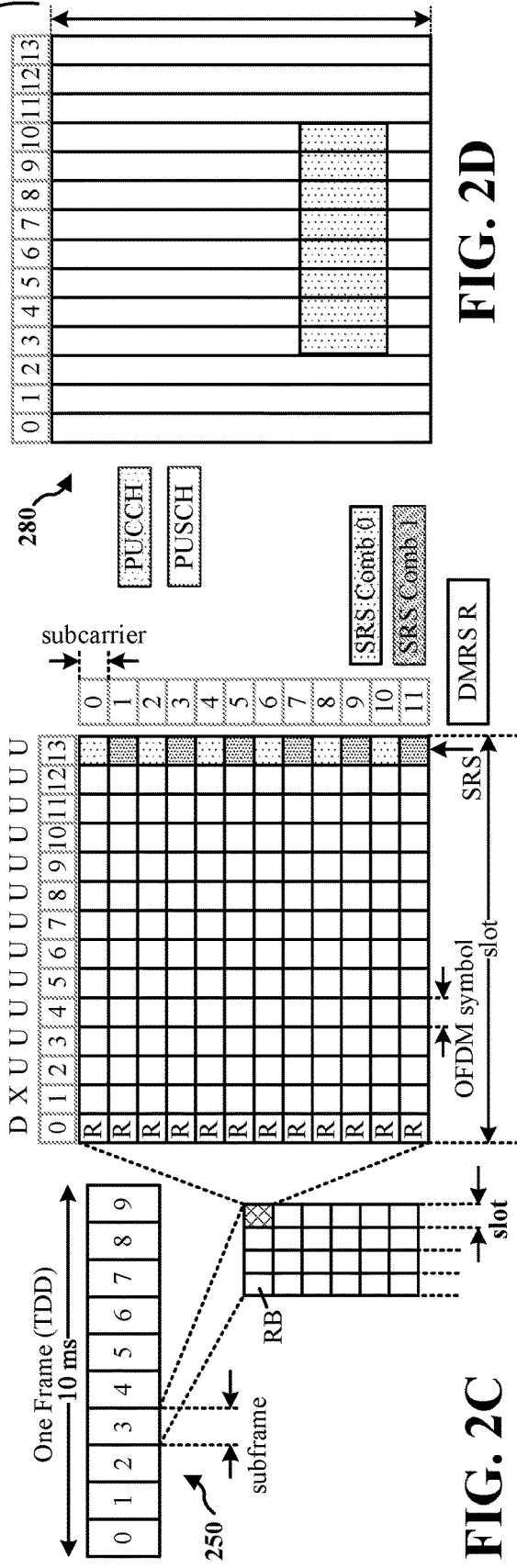

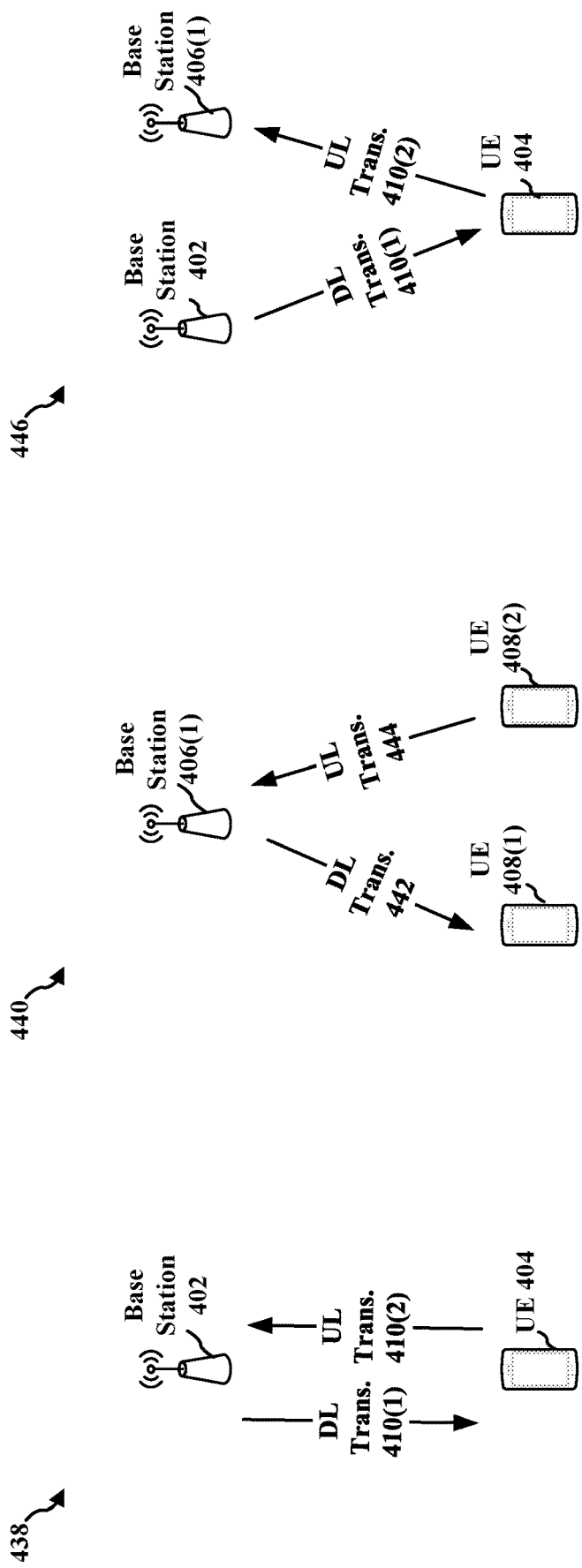

700

```
┌─────────────────────────────────────────────────────────────────────────┐
│ Receiving, from a base station, a plurality of TCI states, the plurality of TCI states │
│ including a full duplex TCI state corresponding to at least two channels for a first   │
│ transmission link type and at least one channel for a second transmission link type    │
│                                    710                                                 │
└─────────────────────────────────────────────────────────────────────────┘
                                      ↓
┌─────────────────────────────────────────────────────────────────────────┐
│ Applying the full duplex TCI state in accordance with a determined application │
│                                    time                                         │
│                                    720                                          │
└─────────────────────────────────────────────────────────────────────────┘
```

FIG. 7

FULL DUPLEX TCI INDICATION UNDER UNIFIED TCI FRAMEWORK

BACKGROUND

Technical Field

The present disclosure relates generally to wireless communication, and more particularly, implementing full duplex transmission configuration indication (TCI) in a unified TCI framework.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving, from a base station, a plurality of transmission configuration indication (TCI) states, the plurality of TCI states including a full duplex TCI state corresponding to at least two channels for a first transmission link type and at least one channel for a second transmission link type. The method may further comprise applying the full duplex TCI state in accordance with a determined application time.

The disclosure also provides an apparatus (e.g., a UE) including a memory storing computer-executable instructions and at least one processor configured to execute the computer-executable instructions transmit, to a UE, a plurality of TCI states, the plurality of TCI states including a full duplex TCI state corresponding to at least two channels for a first transmission link type and at least one channel for a second transmission link type, transmit, to the UE, a reference signal to be measured by the UE to determine channel information for the physical channel based on the full duplex TCI state, and applying the full duplex TCI state for full duplex communications in accordance with a determined application time. In addition, the disclosure also provides an apparatus including means for performing the above method, and a non-transitory computer-readable medium storing computer-executable instructions for performing the above method.

An example implementation includes a method of wireless communication at a base station comprising transmitting, to a user equipment (UE), a plurality of TCI states, the plurality of TCI states including a full duplex TCI state corresponding to at least two channels for a first transmission link type and at least one channel for a second transmission link type and transmitting, to the UE, a reference signal to be measured by the UE to determine channel information for the at least two channels and the one channel based on the full duplex TCI state. The method may further comprise applying the full duplex TCI state for full duplex communications in accordance with a determined application time.

The disclosure also provides an apparatus (e.g., a base station) including a memory storing computer-executable instructions and at least one processor configured to execute the computer-executable instructions to transmit, to a UE, a plurality of TCI states, the plurality of TCI states including a full duplex TCI state corresponding to at least two channels for a first transmission link type and at least one channel for a second transmission link type, transmit, to the UE, a reference signal to be measured by the UE to determine channel information for the at least two channels and the one channel based on the full duplex TCI state, and apply the full duplex TCI state for full duplex communications in accordance with a determined application time. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

FIG. 4B is a first diagram illustrating example full duplex communications between a base station and a UE, in accordance with some aspects of the present disclosure.

FIG. 4C is a second diagram illustrating example full duplex communications between a base station and UEs, in accordance with some aspects of the present disclosure.

FIG. 4D is a third diagram illustrating example communications and components of base stations and UE, in accordance with some aspects of the present disclosure.

FIG. 7 is a flowchart of an example method of implementing full duplex TCI in a unified TCI framework at a UE, in accordance with some aspects of the present disclosure.

DETAILED DESCRIPTION

Figure 1:
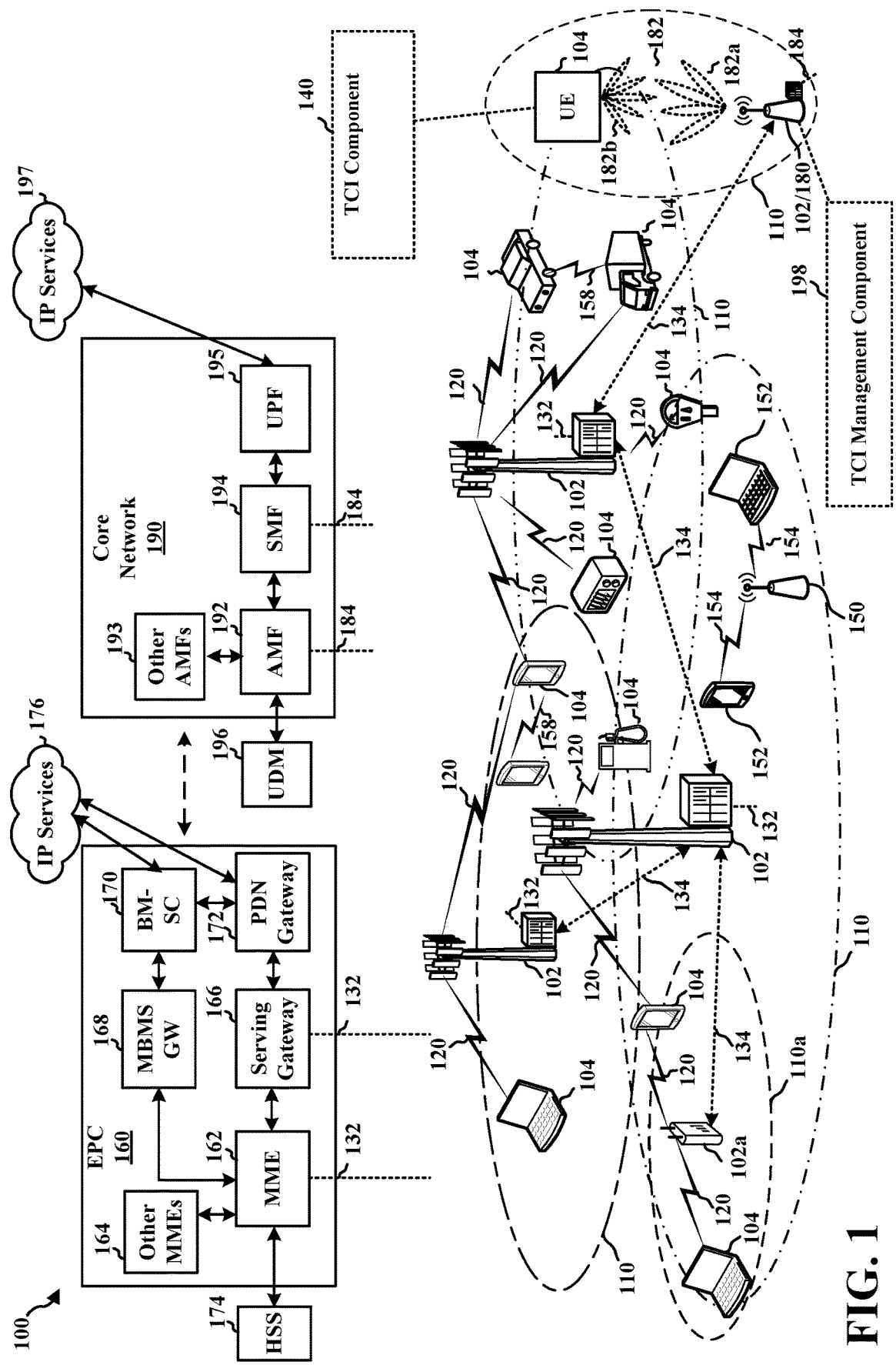
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing full duplex TCI in a unified TCI framework. As used herein, in some aspects, "full duplex communications" may refer to transmitting and receiving data at the same time using a single transceiver component. In some aspects, a base station may transmit a common TCI state pool modified for full duplex communications in a TCI framework. As described in detail herein, a common TCI state pool include at least one full duplex TCI state corresponding to at least two channels for a first transmission link type and at least one channel for a second transmission link type. For example, the full duplex TCI state may apply to two DL channels/signals (e.g., physical downlink control channel (PDCCH), physical downlink shared channel (PDSCH), CSI-RS, or positioning reference signal (PRS)) and one UL channel/signal (e.g., physical uplink control channel (PUCCH), physical uplink shared channel (PUSCH), PRACH, or sounding reference signal (SRS)). As another example, the full duplex TCI state may apply to two UL channels/signals and one DL channel/signal. Upon receipt of the common TCI state pool, the UE may configure beam indication in accordance with the full duplex TCI state. In addition, the base station may transmit a TCI activation message that triggers activation of one or more full duplex TCI states at the UE. For instance, the base station may send a TCI activation message including a TCI state identifier identifying the one or more full duplex TCI states. In response to receiving the TCI activation message, the UE may activate the one or more full duplex TCI states for the channels associated with the one or more full duplex TCI states. Further, the base station may transmit a TCI indication message that triggers a full duplex TCI state at the UE. For instance, the base station may send a TCI indication message including a TCI state identifier identifying the full duplex TCI state. In response to receiving the TCI indication message, the UE may apply the full duplex TCI state for the channels associated with the full duplex TCI state. Accordingly, in some aspects, a UE may be configured to reduce overhead, latency, inefficient use of time and frequency resources, and/or power consumption, while improving spectrum efficiency by enabling common beam indication via TCI states associated with multiple qualified beam pairs for FD transmissions.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a TCI management component 198 configured to manage the TCI state of one or more UEs via TCIs, TCI activation messages, and TCI indication messages. Further, in an aspect, a UE 104 may include a TCI component 140 configured to apply TCI states in response to messages received from a base station 102.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
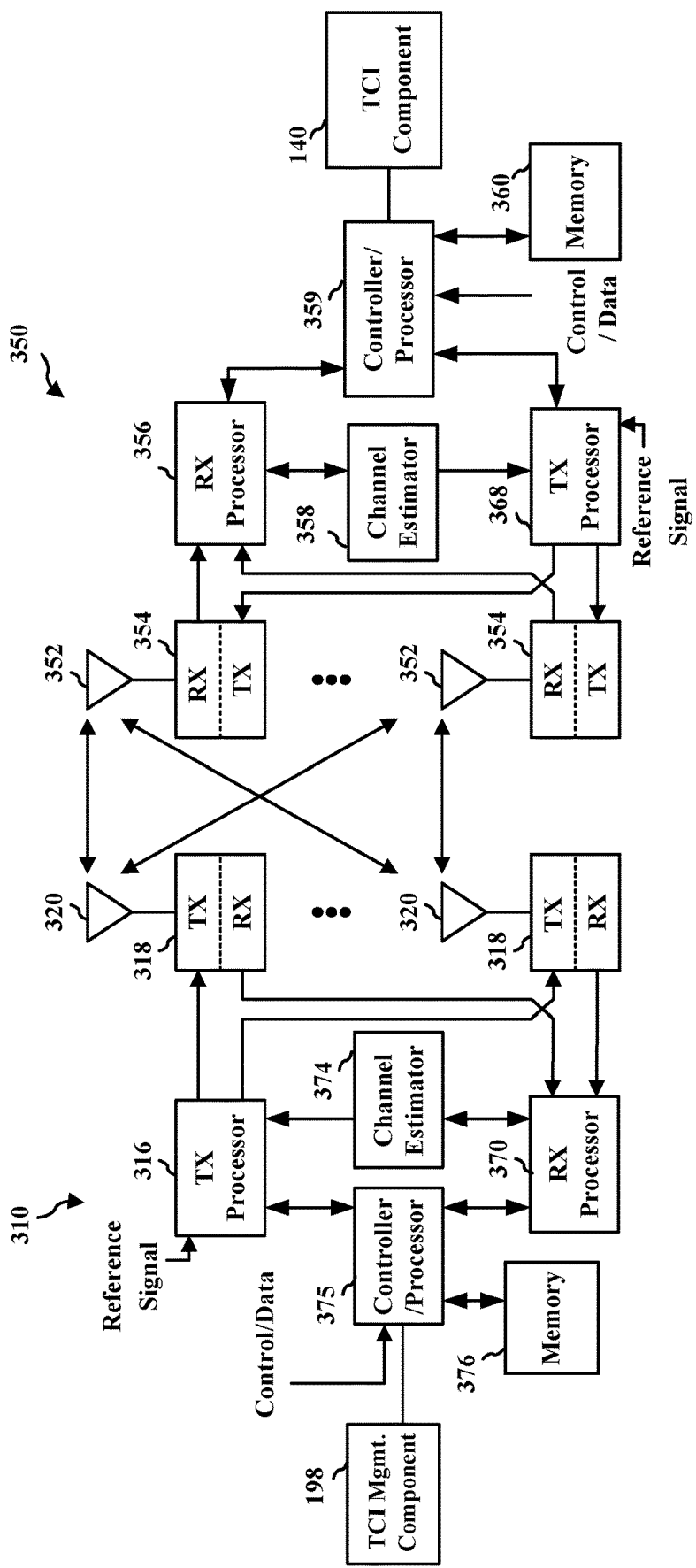
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the TCI component 140 of FIG. 1.

In the base station 102/180, at least one of the TX processor 316, the RX processor 370, and the controller/processor 375 may be configured to perform aspects in connection with TCI management component 198 of FIG. 1.

In some telecommunication systems, two antenna ports are said to be quasi co-located if properties of the channel over which a symbol on one antenna port is conveyed can be inferred from the channel over which a symbol on the other antenna port is conveyed. Further, in some aspects, quasi co-location may define a relationship between two reference signals at a UE receiver. For example, in 5G NR, a set of QCL rules may be signaled to the UE to define properties (e.g., doppler shift, doppler spread, average delay, delay spread, spatial Rx parameter) shared between two reference signals. Further, in some aspects, a TCI is employed to define pairs of reference signals for QCL indication. The TCI may describe which reference signals are used as a QCL source, and which QCL properties can be derived from each reference signal. Further, TCI state may be used to establish the QCL relationship between one or more target reference signals and a source reference signal.

In some aspects, a unified TCI framework may employ a DL common TCI state, a UL common TCI state, and a joint TCI for beam indication. The joint DL/UL TCI may indicate a common beam for at least one DL channel and at least one UL channel. For example, the source reference signals of one or more TCIs may provide common QCL information for UE-dedicated reception on PDSCH and CORESETS. Optionally, the common QCL information can also apply to CSI-RS resource for CSI, CSI-RS resource for BM, and CSI-RS for tracking. Further, the source reference signals of one or more TCIs may also provide a reference for determining common UL TX spatial filters for a dynamic-grant and/or configured grant based PUSCH or dedicated PUCCH resources. Optionally, the UL TX spatial filter can also apply to all SRS resources in resource set(s) configured for antenna switching/codebook-based/non-codebook-based UL transmissions.

In some aspects, a base station and/or a UE may have full duplex capabilities. For example, the UE may perform an UL transmission with a base station via a first panel, and a DL transmission with the base station via a second panel. The present disclosure provides techniques for implementing a TCI state for multiple physical channels. As described in detail above, a unified TCI framework may implement joint full duplex TCI indication for one or more DL channels and one or more UL channels for FD transmissions. For example, a UE may apply a single bi-directional full duplex TCI state or a DL TCI state and an UL TCI state for full duplex transmissions for two DL channels and a UL channel, or two UL channels and a DL channel. However, current systems have not implemented a cogent process for indication and/or activation in systems employing joint full duplex TCI indication. Accordingly, the present techniques enable common beam indication and activation for joint full duplex TCI indication, thereby minimizing or reducing system overhead, latency, and power consumption, and preserving time and frequency resources.

Referring to FIGS. 4-8, in one non-limiting aspect, a system 400 is configured to facilitate common beam indication and activation for full duplex transmissions.

Figure 4A:
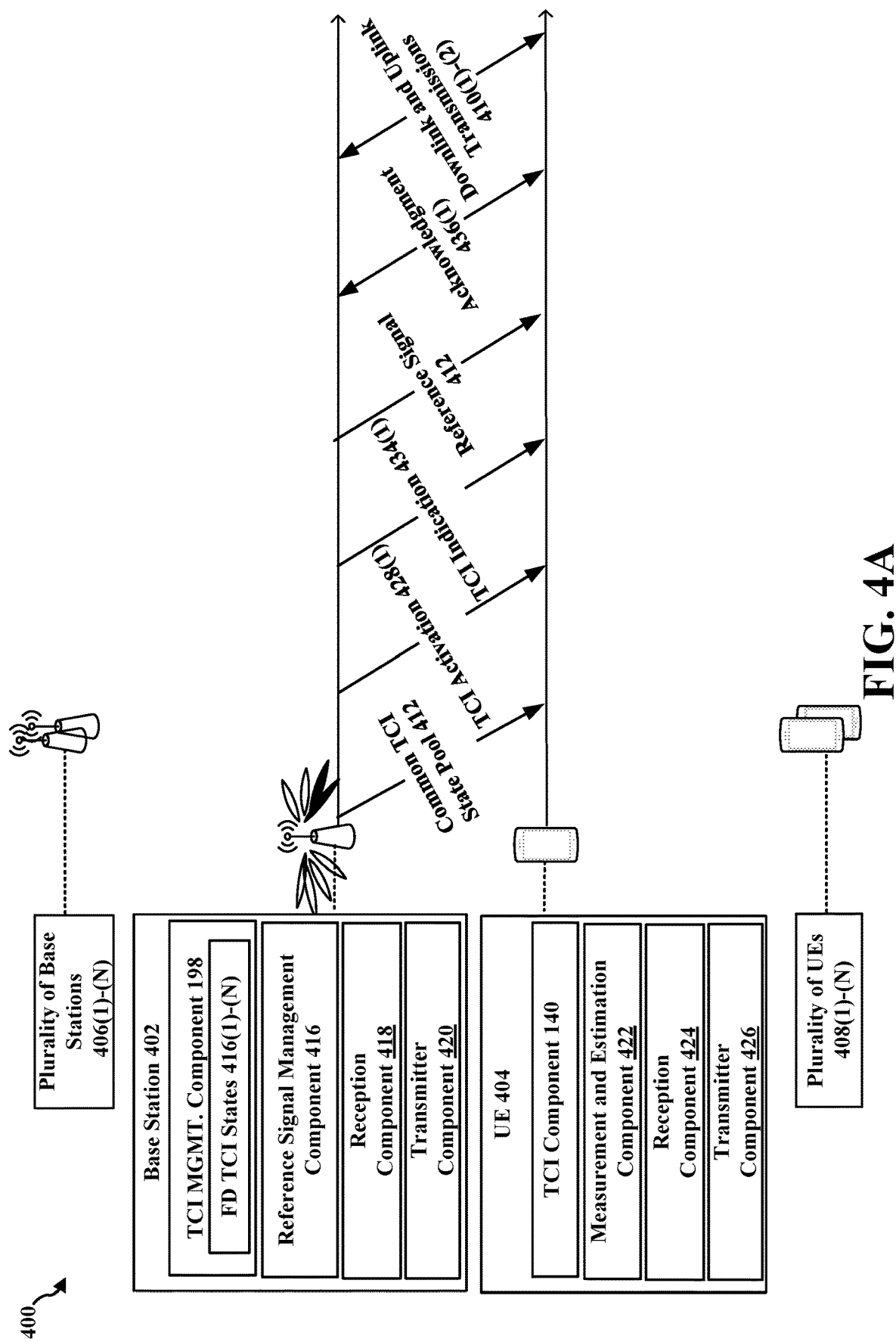
FIG. 4A is a first diagram illustrating example communications and components of a base station and UEs, in accordance with some aspects of the present disclosure.

FIG. 4A is a diagram illustrating example communications and components of base stations and UEs. As illustrated in FIGS. 4A-4C, the system 400 may include a base station 402 (e.g., the base station 102/180) serving a UE 404 (e.g., the UE 104). Further, the system 400 may include a plurality of other base stations 406 and a plurality of other UEs 408 configured to perform similar operations as the base station 402 and the UE 404, respectively. Further, the base station 402 and the UE 404 may be configured for beamformed wireless communications. For example, the base station 402 may exchange downlink transmissions 410(1) and uplink transmissions 410(2) with the UE 404 using directional transmit and receive beams, where each beam has an associated beam ID, beam direction, beam symbols, etc. Further, the base station 402 and the UE 404 may perform full duplex communications. For example, the base station 402 may transmit the downlink transmissions 410(1) to the UE 404 while contemporaneously receiving the uplink transmission 410(2) from the UE 404.

As illustrated in FIG. 4A, the base station 402 may include the TCI management component 198 configured to define groups of reference signals 412(1)-(N) for QCL indication via common TCI state pools 414(1)-(n), and manage TCI states 416(1)-(N) at the UEs (e.g., the UE 404 and the plurality of other UEs 408) via the common TCI state pools 414(1)-(n). Further, the base station 402 may include a reference signal management component 417 configured to transmit the reference signals 412(1)-(N) to the UEs (e.g., the UE 404) and receive the reference signals 412(1)-(N) from the UEs (e.g., the UE 404). Some examples of the reference signals 412(1)-(N) include CSI-RS, PRS, SRS, etc. In addition, the base station 402 may include a reception component 418 and a transmitter component 420. The reception component 418 may include, for example, a radio frequency (RF) receiver for receiving the signals described herein. The transmitter component 420 may include, for example, an RF transmitter for transmitting the signals described herein. In an aspect, the reception component 418 and the transmitter component 420 may be co-located in a transceiver (e.g., the transceiver 610 shown in FIG. 6).

As illustrated in FIG. 4A, the UE 404 may include the TCI component 140 configured to activate FD TCI states 416(1)-(N) at the UE 404. Further, the UE 404 may include the measurement and estimation component 422 (e.g., channel estimator 358) configured to measure the reference signals 412 and estimate physical channels based on upon the reference signals 412 and the FD TCI states 416(1)-(N). In addition, the UE 404 may include a reception component 424 and a transmitter component 426. The transmitter component 426 may be configured to generate signals for transmission operations as described herein. The transmitter component 426 may include, for example, a RF transmitter for transmitting the signals described herein. The reception component 424 may include, for example, a RF receiver for receiving the signals described herein. In an aspect, the reception component 424 and the transmitter component 426 may be co-located in a transceiver (e.g., the transceiver 510 shown in FIG. 5).

As illustrated in FIG. 4A, the base station 402 may determine the common TCI state pools 414 and transmit a common TCI state pool 414 to the UE 404 in order to configure the TCI states of the TCI state pool 414 at the UE 404 (e.g., the FD TCI states 416). In some aspects, the common TCI state pool 414 may be signaled to the UE 404 using RRC signaling. As described in detail herein, the common TCI state pools 414 may define QCL relationships between the antenna ports of the base station 402 used for downlink and uplink communications with the UEs (e.g., the downlink transmissions 410(1) and the uplink transmissions 410(2) with the UE 404). As described in detail herein, the FD TCI states 416 may be associated with qualified beam pairs for full duplex communications. As described herein, in some aspects, a "qualified beam pair" may refer to a beam pair having at least one of beam separation, self-interference, or clutter echo below a predefined threshold. In some aspects, the predefined amount may correspond to an acceptable level for performance of full duplex communications using the beam pair, e.g., a level that does not cause communication error at the reception component 424 of the UE. Further, the TCI component 140 and/or the TCI management component 198 may configured to determine whether a beam pair is a qualified beam pair.

For example, in some aspects, a FD TCI state 416 may be associated with reference signal sets (e.g., a SSB, an aperiodic, periodic, or semi-persistent CSI-RS, or an aperiodic, periodic, or semi-persistent SRS) for different QCL types (e.g., QCL types for different combinations of Doppler shift, Doppler spread, average delay, delay spread, or spatial receive parameters) to downlink reception and for different spatial transmit filters for uplink transmission. Furthermore, different FD TCI states 416 may correspond to different QCL relationships between antenna ports used by the physical channels employed for downlink and uplink communication between the base station 402 and the UE 404, e.g., communication of the downlink transmissions 410(1) and reception of the uplink transmissions 410(2).

In some aspects, a FD TCI state 416 may apply to at least two channels for a first transmission link type and at least one channel for a second transmission link type. For example, a FD TCI state 416 may apply to two DL channels/signals and one UL channel/signal, or one DL channel/signal and two UL channels/signal. As another example, a FD TCI state 416 DL TCI state and a UL TCI state for a pair of DL channels/signals and UL channels/signals for FD transmissions. The DL signals/channels may include one or more of PDCCH, PDSCH, CSI-RS, positioning reference signal (PRS.) The UL signals/channels may include one or more of PUCCH, PUSCH, PRACH, or SRS. Further, the channels may be UE dedicated channels or broadcast channels. In addition, a FD TCI state 416 may apply to multiple component carriers with each component carrier using the same beam pairs. Upon receipt of the common TCI state pools 414 by the UE 404, the TCI component 140 may complete configuration of the UE 404 with the FD TCI states 416(1)-(N).

Further, the base station 402 may activate one or more of the TCI states of the UE 404, e.g., the base station 402 may activate one or more of the FD TCI states 414 at the UE 404. As illustrated in FIG. 4A, the base station 402 may transmit the TCI activation 428(1) to the UE 404. In some examples, the TCI activation 428(1) may be transmitted to the UE 404 via a medium access control-control element (MAC-CE). Further, the TCI activations 428(1)-(N) may include one or more TCI state identifiers 432 identifying one or more TCI states (e.g., one or more of the FD TCI states 416) within the common TCI state pools 414. In response to the TCI activation 428(1), the UE 404 may activate the FD TCI states 416 for the physical channels/signals associated with the TCI state identifiers 432 included in the TCI activation 428(1).

In addition, the base station 402 may select one of the activated TCI states that may be applied to DL channels and UL channels. For example, the base station 402 may transmit the TCI indication 434(1) to the UE 404. In some examples, the TCI indications 434(1)-(N) may be transmitted to the UE 404 via DCI. Further, the TCI indications 434(1)-(N) may include a TCI state identifier 432 identifying a FD TCI state 416 within the common TCI state pools 414. In response to receiving the TCI indication 434(1), the UE 404 may apply the FD TCI state 416 to the physical channels targeted by the FD TCI state 416 of the TCI indication 434(1) at an application time.

Additionally, the TCI component 140 and the TCI management component 198 may determine the application time of the FD TCI state 416 identified in the TCI indication 434. In some aspects, the TCI component 140 and the TCI management component 198 may determine the application time by adding a predefined amount of slots or time to a slot associated with the TCI indication 434. For example, the application time may be a predefined amount of time or slots/symbols starting from the end of slot containing the DCI including the TCI indication 434, or from the end of the DCI including the TCI indication 434. In some other aspects, the TCI component 140 and the TCI management component 198 may determine the application time by adding predefined amount of slots or time to a slot associated with an acknowledgment 436 to the TCI indication 434. For example, the application time may be a predefined amount of time or slots/symbols starting from the end of slot containing the acknowledgment 436 to the DCI including the TCI indication 434, or from the end of the acknowledgment 436 to the DCI including the TCI indication 434. If the DL DCI format is 1_0, 1_1, or 1_2 and schedules DL reception, the acknowledgment can be the acknowledgment for the scheduled DL reception, e.g. the PDSCH. If the UL DCI format is 1_0, 1_1, or 1_2 and schedules UL transmission, the acknowledgment can be the acknowledgment for the scheduled UL transmission, e.g. the PUSCH, the SRS, etc. In some other aspects, if a DCI format is used without a scheduled transmission, the acknowledgment can be a dedicated acknowledgment bit for the DCI, which can be carried in the PUCCH or the PUSCH.

Further, in some aspects, if the application time of the DL/UL TCI state indication for half duplex is set to a first predefined amount of time or slots/symbols after the TCI indication 434 or acknowledgment 436 to the TCI indication 434, the application time of the DL/UL TCI state indication for full duplex may be set to a second predefined amount of time or slots/symbols after the TCI indication 434 or acknowledgment 436 to the TCI indication 434. Further, the second predefined amount may be larger than the first predefined amount due to the preparation time for full duplex mode. Additionally, the difference between the application time and the receipt of the TCI indication 434 or the acknowledgment 436 may be greater when multiple component carriers are employed due to preparation time for the different subcarrier spacing modes.

As an example, the TCI indication 434 may include a TCI state identifier 432 of a FD TCI state 416. Further, the FD TCI state 416 may be associated with the PDCCH, the PDSCH, and the PUCCH. In response to receipt of the TCI indication 434, the UE 404 may measure a reference signal 412, and perform channel estimation to receive on the PDCCH and the PDSCH and transmit on the PUCCH based on the FD TCI state 416 and the measurement of the reference signal 412. For example, the aforementioned physical channels may be employed for transmission of the uplink transmissions 410(2) and reception of the downlink transmissions 410(1).

FIGS. 4B-4D are diagrams illustrating example full duplex communications and components of base stations and UEs. For example, as illustrated in diagram 438 of FIG. 4B, in some aspects, the base station 402 may transmit the downlink transmissions 410(1) to the UE 404 while contemporaneously receiving the uplink transmission 410(2) from the UE 404. As another example, as illustrated in diagram 440, the base station 406(1) may transmit the downlink transmissions 442 to the UE 408(1) while contemporaneously receiving the uplink transmission 444 from the UE 408(2). As yet still another example, as illustrated in diagram 446, the UE 404 may transmit the downlink transmissions 410(1) to the base station 402 while contemporaneously receiving the uplink transmission 410(2) from the base station 406(1). Further, in some aspects, the present disclosure may be applied to facilitate full duplex TCI indication to the UE 404 in diagrams 438 and 446.

Figure 5:
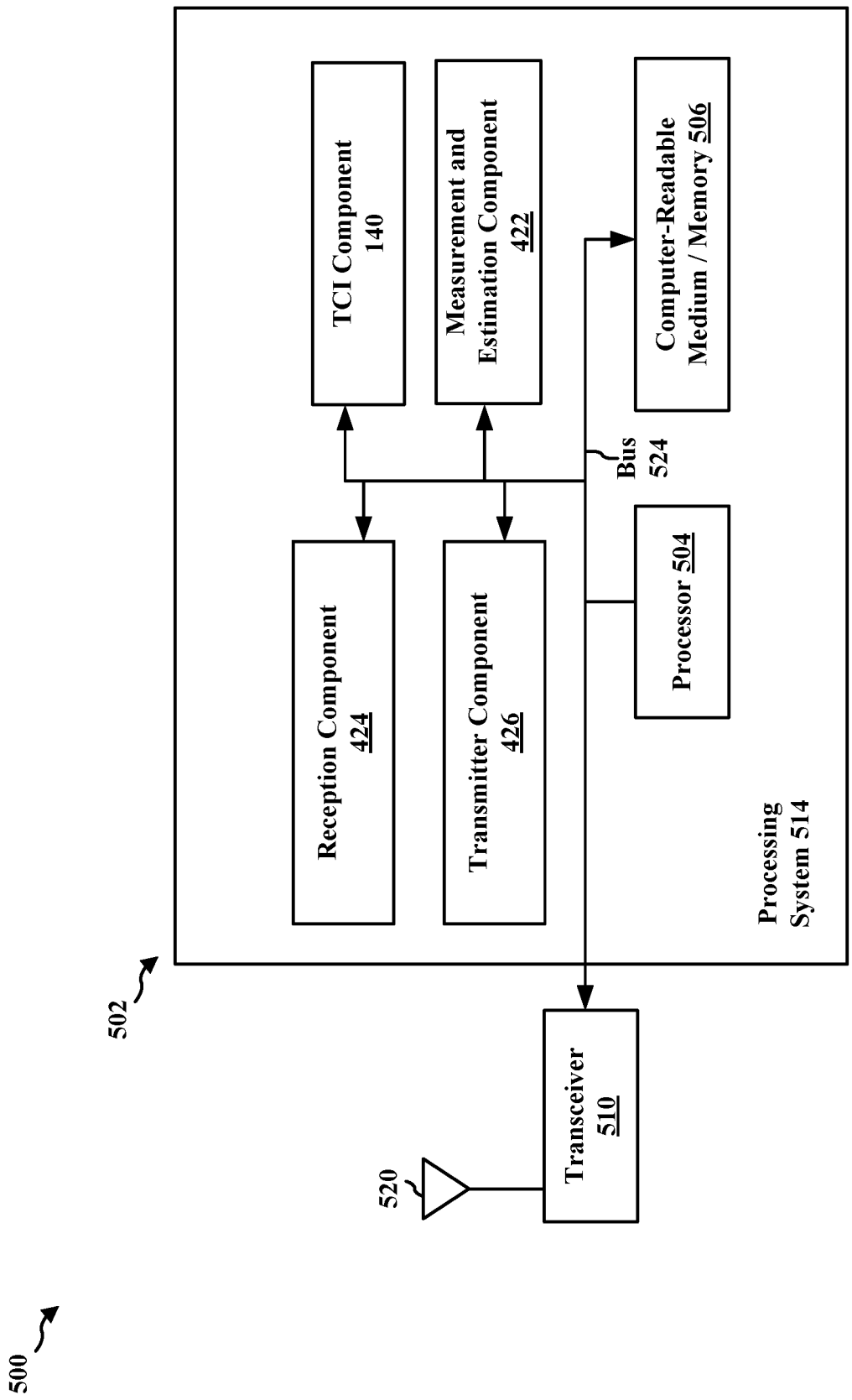
FIG. 5 is a diagram illustrating an example of a hardware implementation for a UE employing a processing system, in accordance with some aspects of the present disclosure.

FIG. 5 is a diagram 500 illustrating an example of a hardware implementation for a UE 502 (e.g., the UE 104, the UE 404, etc.) employing a processing system 514. The processing system 514 may be implemented with a bus architecture, represented generally by the bus 524. The bus 524 may include any number of interconnecting buses and/or bridges depending on the specific application of the processing system 514 and the overall design constraints. The bus 524 links together various circuits including one or more processors and/or hardware components, represented by the processor 504, the TCI component 140, the measurement and estimation component 422, and the computer-readable medium (e.g., non-transitory computer-readable medium)/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 may be coupled with one or more antennas 520. The transceiver 510 provides a means for communicating with various other apparatus over a transmission medium. The transceiver 510 receives a signal from the one or more antennas, extracts information from the received signal, and provides the extracted information to the processing system 514, specifically the reception component 424. The reception component 424 may receive the downlink transmissions 410(1), the reference signals 412, the common TCI state pools 414, the TCI activation 428, the TCI state identifiers 432, the TCI indication 434, and/or the acknowledgment 436. In addition, the transceiver 510 receives information from the processing system 514, specifically the transmitter component 426, and based on the received information, generates a signal to be applied to the one or more antennas. Further, the transmitter component 426 may transmit the uplink transmissions 410(2), the reference signals 412, and the acknowledgment 436.

The processing system 514 includes a processor 504 coupled with a computer-readable medium/memory 506 (e.g., a non-transitory computer readable medium). The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the TCI component 140, and the measurement and estimation component 422. The aforementioned components may be a software component running in the processor 504, resident/stored in the computer readable medium/memory 506, one or more hardware components coupled with the processor 504, or some combination thereof. The processing system 514 may be a component of the UE 350 and may include the memory 360 and/or at least one of the TX processor 368, the RX processor 356, and the controller/processor 359. Alternatively, the processing system 514 may be the entire UE (e.g., see 350 of FIG. 3, 404 of FIG. 4A).

The TCI component 140 may be configured to receive the common TCI state pools 414 and configure the UE 502 based upon the TCI states of the common TCI state pools 414, e.g., the FD TCI state 416(1)-(N). Further, the TCI component 140 may be configured to activate a FD TCI state 416 at the UE 502 based on a TCI state identifier 432 included in a TCI activation 428, and apply a TCI state 416 based on a TCI indication 434. Further, the TCI component 140 may provide QCL information associated with the FD TCI state 416 to the measurement and estimation component 422. The measurement and estimation component 422 may be configured to measure the reference signals 412. As an example, the measurement and estimation component 422 may measure characteristics (e.g., a property, attribute, or a quality) of beamformed reference signals 412(1)-(N) (e.g., CSI-RS, SSB, etc.) received from the base station 402 at the reception component 424.

The aforementioned means may be one or more of the aforementioned components of the UE 502 and/or the processing system 514 of UE 502 configured to perform the functions recited by the aforementioned means. As described supra, the processing system 514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 6:
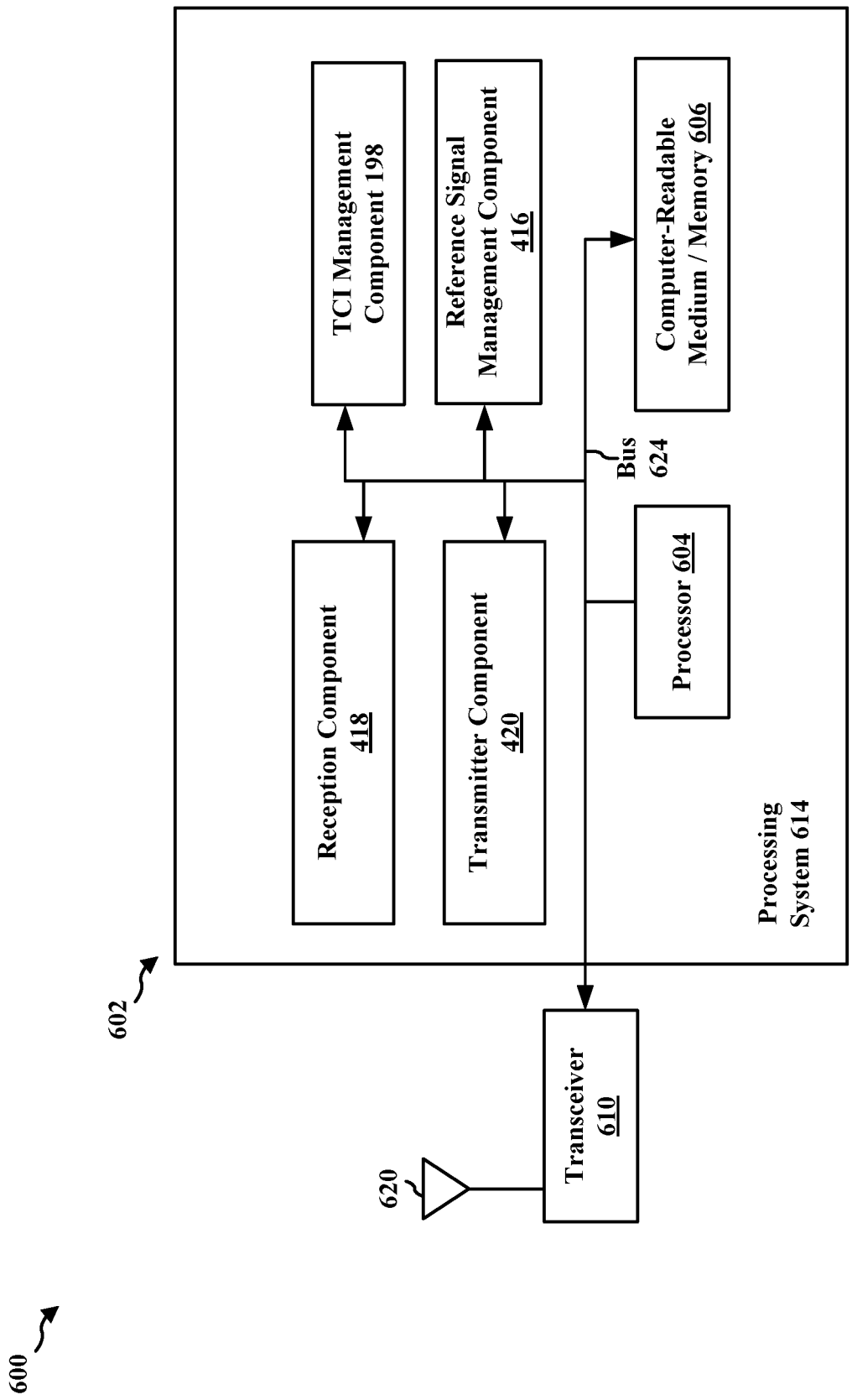
FIG. 6 is a diagram illustrating an example of a hardware implementation for a base station employing a processing system, in accordance with some aspects of the present disclosure.

FIG. 6 is a diagram 600 illustrating an example of a hardware implementation for a base station 602 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the TCI management component 198, the reference signal management component 417, and the computer-readable medium/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 is coupled with one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 418. The reception component 418 may receive the downlink transmissions 410(1), the reference signals 412, and the acknowledgment 436. In addition, the transceiver 610 receives information from the processing system 614, specifically the transmitter component 420, and based on the received information, generates a signal to be applied to the one or more antennas 620. Further, the transmitter component 420 may send the downlink transmissions 410(1), the reference signals 412, the common TCI state pools 414, the TCI activation 428, the TCI state identifiers 432, and/or the TCI indication 434.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the TCI management component 198, or the reference signal management component 417. The aforementioned components may be software components running in the processor 604, resident/stored in the computer readable medium/memory 606, one or more hardware components coupled with the processor 604, or some combination thereof. The processing system 614 may be a component of the base station 310 and may include the memory 376 and/or at least one of the TX processor 316, the RX processor 370, and the controller/processor 375. Alternatively, the processing system 614 may be the entire base station (e.g., see 310 of FIG. 3, 404 of FIG. 4A).

The TCI management component 198 may be configured to determine FD TCI states 416 to apply at the UEs (e.g., the UE 404, the UEs 408, and the UE 502), configure FD TCI states 416 at the UEs via common TCI state pools 414(1)-(N), activate FD TCI states 416 via TCI activations 428(1)-(N) including TCI state identifiers 432 of the FD TCI states 416, and apply FD TCI states 416 via TCI indications 434(1)-(N). Further, the reference signal management component 417 may transmit the reference signals 412 to the UEs and receive the reference signals 412 (e.g., SRS) from the UEs (e.g., the UE 404, the UEs 408, and the UE 502).

The aforementioned means may be one or more of the aforementioned components of the base station 602 and/or the processing system 614 of the base station 602 configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 7 is a flowchart of a method 700 of implementing full duplex transmission configuration indication (TCI) in a unified TCI framework, in accordance with some aspects of the present disclosure. The method may be performed by a UE (e.g., the UE 104 of FIGS. 1 and 3, which may include the memory 360 and which may be the entire UE 104 or a component of the UE 104, such as the TCI component 140, the TX processor 368, the RX processor 356, and/or the controller/processor 359; the UE 404 of FIG. 4A; and/or the UE 502 of FIG. 5).

At block 710, the method 700 receiving, from a base station, a plurality of TCI states, the plurality of TCI states including a full duplex TCI state corresponding to at least two channels for a first transmission link type and at least one channel for a second transmission link type. For example, the UE 404 may receive the common TCI state pool 414 from the base station 402. Further, in some aspects, the common TCI state pool 414 may be signaled via RRC signaling. In some aspects, the common TCI state pools 414 may comprise a plurality of FD TCI states 416(1)-(N). For example, a UE may apply a single bi-directional FD TCI state or a DL TCI state plus an UL TCI state for FD transmissions for two DL channels and a UL channel, or two UL channels and a DL channel. For instance, the FD TCI state 416 may represent a beam indication for two DL channels/signals (e.g., PDCCH, PDSCH, CSI-RS, or PRS) and one UL channel/signal (e.g., PUCCH, PUSCH, PRACH, or SRS). In another instance, the full duplex TCI state may represent a beam indication for two UL channels/signals and one DL channel/signal. Upon receipt of the common TCI state pool, the UE may configure beam indication in accordance with the full duplex TCI state.

Accordingly, the UE 104, the UE 404, UE 502, the TX processor 368, the RX processor 356, and/or the controller/processor 359, executing the TCI component 140 may provide means for receiving, from a base station, a plurality of TCI states, the plurality of TCI states including a full duplex TCI state corresponding to at least two channels for a first transmission link type and at least one channel for a second transmission link type.

At block 720, the method 700 may include applying the full duplex TCI state in accordance with a determined application time. For example, the TCI component 140 may cause application of the FD TCI state 416 at an application time at the UE 404. In some aspects, the TCI component 140 may apply the FD TCI state 416 in response to a TCI indication 434 received from the base station 402. In some aspects, the TCI indication 434 may be DCI received from the base station 402. Further, in some aspects, the measurement and estimation component 422 may further generate channel estimation information for the at least two channels and/or the at least one channel using a reference signal 412 received by the UE 404, the UE 404 may perform full duplex communications with at least one base station (e.g., the base station 402) via the channel estimation information. In some aspects, the measurement and estimation component 422 may determine the channel information based on the measurements of the reference signal 412 and the QCL information of the FD TCI state 416, which provides a relationship between the reference signal and target signals associated with the physical channels.

Additionally, the TCI component 140 may be configured to determine the application time of the FD TCI state 416 identified in the TCI indication 434. In some aspects, the TCI component 140 may determine the application time by adding a predefined amount of slots or time to a slot associated with the TCI indication 434. For example, the application time may be a predefined amount of time or slots/symbols starting from the end of slot containing the DCI including the TCI indication 434, or from the end of the DCI including the TCI indication 434. In some other aspects, the TCI component 140 may determine the application time by adding predefined amount of slots or time to a slot associated with an acknowledgment 436 to the TCI indication 434. For example, the application time may be a predefined amount of time or slots/symbols starting from the end of slot containing the acknowledgment 436 to the DCI including the TCI indication 434, or from the end of the acknowledgment 436 to the DCI including the TCI indication 434.

Accordingly, the UE 104, the UE 404, UE 502, the TX processor 368, the RX processor 356, and/or the controller/processor 359 executing the TCI component 140 may provide means for applying the full duplex TCI state in accordance with a determined application time.

Figure 8:
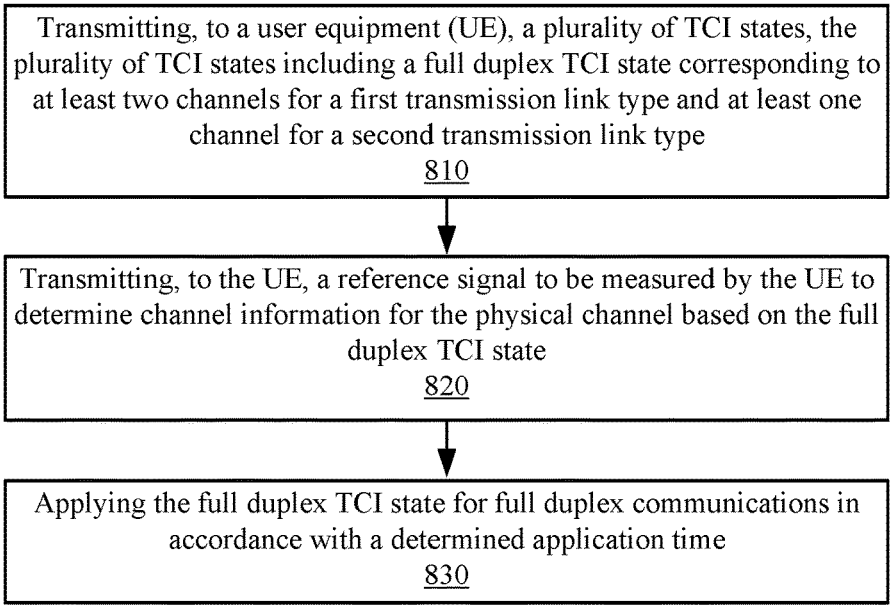
FIG. 8 is a flowchart of an example method of implementing full duplex TCI in a unified TCI framework at a base station, in accordance with some aspects of the present disclosure.

FIG. 8 is a flowchart of a method 800 of implementing full duplex transmission configuration indication (TCI) in a unified TCI framework. The method may be performed by a base station (e.g., the base station 102, which may include the memory 376 and which may be the entire base station or a component of the base station, such as TCI management component 198, the reference signal management component 417, the TX processor 316, the RX processor 370, and/or the controller/processor 375; the base station 402, the base station 602).

At block 810, the method 800 may include transmitting, to a user equipment (UE), a plurality of TCI states, the plurality of TCI states including a full duplex TCI state corresponding to at least two channels for a first transmission link type and at least one channel for a second transmission link type. For example, the TCI management component 198 may transmit the common TCI state pool 414 to the UE 404. Further, in some aspects, the common TCI state pool 414 may be signaled via RRC signaling. In some aspects, the common TCI state pools 414 may comprise a plurality of FD TCI states 416(1)-(N). For example, a UE may apply a single bi-directional FD TCI state or a DL TCI state plus an UL TCI state for FD transmissions for two DL channels and a UL channel, or two UL channels and a DL channel. For instance, the FD TCI state 416 may represent a beam indication for two DL channels/signals (e.g., physical downlink control channel (PDCCH), physical downlink shared channel (PDSCH), CSI-RS, or positioning reference signal (PRS)) and one UL channel/signal (e.g., physical uplink control channel (PUCCH), physical uplink shared channel (PUSCH), PRACH, or sounding reference signal (SRS)). In another instances, the full duplex TCI state may represent a beam indication for two UL channels/signals and one DL channel/signal. Upon receipt of the common TCI state pool, the UE may configure beam indication in accordance with the full duplex TCI state.

Accordingly, the base station 102, the TX processor 316, the RX processor 370, and/or the controller/processor 375 executing the TCI management component 198 may provide means for transmitting, to a user equipment (UE), a plurality of TCI states, the plurality of TCI states including a full duplex TCI state corresponding to at least two channels for a first transmission link type and at least one channel for a second transmission link type.

At block 820, the method 800 may include transmitting, to the UE, a reference signal to be measured by the UE to determine channel information for the physical channel based on the full duplex TCI state. For example, base station 402 may transmit a reference signal 412 to the UE 404. As described in detail herein, QCL information described within a FD TCI state 416 may define a relationship between the reference signal 412 and another reference signal associated with a physical channel.

Accordingly, the base station 102, the RX processor 370, and/or the controller/processor 375 executing the TCI management component 198 may provide means for transmitting, to the UE, a reference signal to be measured by the UE to determine channel information for the channels (i.e., the at least two channels for a first transmission link type and at least one channel for a second transmission link type) based on the FD TCI state 416.

At block 830, the method 800 may include applying the full duplex TCI state for full duplex communications in accordance with a determined application time. For example, the base station 402 may transmit the TCI indication 434 to the UE 404. The TCI indication 434 may include one or more TCI state identifiers 432. In some aspects, the TCI indication 434 may be a DCI message including the TCI state identifiers 432. Further, the base station 402 may exchange downlink transmissions 410(1) and uplink transmissions 410(2) with the UE 404 via the at least two channels for the first transmission link type and the at least one channel for the second transmission link type based on channel information determined using the FD TCI state 416 identified by the TCI indication 434 starting an application time.

Additionally, the TCI management component 198 may be configured to determine the application time of the FD TCI state 416 identified in the TCI indication 434. In some aspects, the TCI management component 198 may determine the application time by adding a predefined amount of slots or time to a slot associated with the TCI indication 434. For example, the application time may be a predefined amount of time or slots/symbols starting from the end of slot containing the DCI including the TCI indication 434, or from the end of the DCI including the TCI indication 434. In some other aspects, the TCI management component 198 may determine the application time by adding predefined amount of slots or time to a slot associated with an acknowledgment 436 to the TCI indication 434. For example, the application time may be a predefined amount of time or slots/symbols starting from the end of slot containing the acknowledgment 436 to the DCI including the TCI indication 434, or from the end of the acknowledgment 436 to the DCI including the TCI indication 434.

Accordingly, the base station 102, the RX processor 370, and/or the controller/processor 375 executing the TCI management component 198 may provide means for include applying the full duplex TCI state for full duplex communications in accordance with a determined application time.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a UE, the method comprising: receiving, from a base station, a plurality of transmission configuration indication (TCI) states, the plurality of TCI states including a full duplex TCI state corresponding to at least two channels for a first transmission link type and at least one channel for a second transmission link type; and applying the full duplex TCI state in accordance with a determined application time.

B. The method as paragraph A recites, wherein receiving the plurality of TCI states comprises receiving radio resource control (RRC) signaling including a common TCI state pool including the plurality of TCI states, and further comprising configuring the UE using the common TCI state pool.

C. The method as any of paragraphs A-B recite, further comprising: receiving a TCI activation including one or more TCI state identifiers, the one or more TCI state identifiers including a full duplex TCI state identifier that identifies the full duplex TCI state; and activating one or more TCI states corresponding to the one or more TCI state identifiers.

D. The method as any of paragraphs A-C recite, wherein the TCI activation is received within a medium access control-control element (MAC-CE) message.

E. The method as any of paragraphs C-D recite, wherein applying the full duplex TCI state comprises applying the full duplex TCI state in response to a TCI indication, and further comprising receiving the indication including an indication identifier that identifies the full duplex TCI state.

F. The method as paragraph E recites, further comprising: calculating the determined application time by adding a predefined amount of slots or time to a slot associated with the TCI indication.

G. The method as paragraph E recites, wherein the indication is received within downlink control information (DCI).

H. The method as paragraph G recites, further comprising: calculating the determined application time by adding a predefined amount of slots or time from an end of the DCI.

I. The method as paragraph G recites, further comprising: calculating the determined application time by adding a predefined amount of slots or time to a slot associated with an acknowledgment to the DCI.

J. The method as paragraph G recites, further comprising transmitting an acknowledgment to the DCI.

K. The method as paragraph J recites, further comprising: calculating the determined application time by adding a predefined amount of slots or time from an end of the acknowledgment to the DCI.

L. The method as any of paragraphs A-K recite, wherein applying the full duplex TCI state comprises: generating channel estimation information for the at least two channels and/or the at least one channel using a reference signal received by the UE; and performing full duplex communications with at least one base station via the channel estimation information.

M. The method as any of paragraphs A-L recite, wherein the first transmission link type includes uplink channels and the second transmission link type includes downlink channels.

N. The method as any of paragraphs A-L recite, wherein the first transmission link type includes downlink channels and the second transmission link type includes uplink channels.

O. The method as any of paragraphs A-N recite, wherein the full duplex TCI state is associated with a qualified full duplex beam pair.

P. A UE for wireless communication, comprising a memory storing computer-executable instructions; and at least one processor coupled with the memory and configured to execute the computer-executable instructions to perform the method of any of paragraphs A-O.

Q. A UE for wireless communication, comprising means for performing the method of any of paragraphs A-O.

R. A non-transitory computer-readable medium storing computer executable code, the code when executed by a processor causes the processor to perform the method of any of paragraphs A-O.

S. A method of wireless communication at a base station, the method comprising: transmitting, to a user equipment (UE), a plurality of TCI states, the plurality of TCI states including a full duplex TCI state corresponding to at least two channels for a first transmission link type and at least one channel for a second transmission link type; transmitting, to the UE, a reference signal to be measured by the UE to determine channel information for the at least two channels and the one channel based on the full duplex TCI state; and applying the full duplex TCI state for full duplex communications in accordance with a determined application time.

T. The method as paragraph S recites, wherein transmitting the plurality of TCI states comprises transmitting radio resource control (RRC) signaling including a common TCI state pool to configure the plurality of TCI states at the UE.

U. The method as any of paragraphs S-T recite, further comprising: transmitting a TCI activation including a full duplex TCI state identifier that identifies the full duplex TCI state, the TCI activation activating the full duplex TCI state at the UE before the application time.

V. The method as any of paragraphs S-U recite, wherein the TCI activation is received within a medium access control-control element (MAC-CE) message.

W. The method as any of paragraphs S-V recite, wherein applying the full duplex TCI state comprises transmitting a TCI indication to the UE.

X. The method as paragraph W recites, further comprising: calculating the determined application time by adding a predefined amount of slots or time to a slot associated with the TCI indication.

Y. The method as paragraph W recites, wherein the TCI indication is received within downlink control information (DCI).

Z. The method as paragraph Y recites, further comprising: calculating the determined application time by adding a predefined amount of slots or time from an end of the DCI.

AA. The method as paragraph Y recites, further comprising: calculating the determined application time by adding a predefined amount of slots or time to a slot associated with an acknowledgment to the DCI.

AB. The method as paragraph Y recites, further comprising receiving an acknowledgment to the DCI from the UE.

AC. The method as paragraph AB recites, further comprising: calculating the determined application time by adding a predefined amount of slots or time from an end of the acknowledgment to the DCI.

AD. The method as any of paragraphs S-AC recite, wherein the first transmission link type includes uplink channels and the second transmission link type includes downlink channels.

AE. The method as any of paragraphs S-AC recite, wherein the first transmission link type includes downlink channels and the second transmission link type includes uplink channels.

AF. A base station for wireless communication, comprising a memory storing computer-executable instructions; and at least one processor coupled with the memory and configured to execute the computer-executable instructions to perform the method of any of paragraphs S-AE.

AG. A base station for wireless communication, comprising means for performing the method of any of paragraphs S-AE.

AH. A non-transitory computer-readable medium storing computer executable code, the code when executed by a processor causes the processor to perform the method of any of paragraphs S-AE.

What is claimed is:

1. A method of wireless communication at a UE, the method comprising:
receiving, from a base station, a plurality of transmission configuration indication (TCI) states, the plurality of TCI states including a full duplex TCI state corresponding to at least two channels for a first transmission link type and at least one channel for a second transmission link type;

receiving, within downlink control information (DCI), an indication including an indication identifier that identifies the full duplex TCI state;

transmitting an acknowledgment to the DCI;

determining an application time by adding a predefined amount of slots or time from an end of the acknowledgment to the DCI; and applying the full duplex TCI state in accordance with the indication identifier and the determined application time.

2. The method of claim 1, wherein the receiving the plurality of TCI states comprises receiving radio resource control (RRC) signaling including a common TCI state pool including the plurality of TCI states, and further comprising configuring the UE using the common TCI state pool.

3. The method of claim 1, wherein the applying the full duplex TCI state comprises:

generating channel estimation information for the at least two channels or the at least one channel using a reference signal received by the UE; and performing full duplex communications with at least one base station via the channel estimation information.

4. The method of claim 1, wherein the first transmission link type includes uplink channels and the second transmission link type includes downlink channels.

5. The method of claim 1, wherein the first transmission link type includes downlink channels and the second transmission link type includes uplink channels.

6. The method of claim 1, wherein the full duplex TCI state is associated with a qualified full duplex beam pair.

7. A user equipment (UE) for wireless communication, comprising:

a memory storing computer-executable instructions; and at least one processor coupled with the memory and configured to execute the computer-executable instructions to:

receive, from a base station, a plurality of transmission configuration indication (TCI) states, the plurality of TCI states including a full duplex TCI state corresponding to at least two channels for a first transmission link type and at least one channel for a second transmission link type;

receive, within downlink control information (DCI), an indication including an indication identifier that identifies the full duplex TCI state;

transmit an acknowledgment to the DCI;

determine an application time by adding a predefined amount of slots or time from an end of the acknowledgment to the DCI; and apply the full duplex TCI state in accordance with the indication identifier and the determined application time.

8. The UE of claim 7, wherein the computer-executable instructions are further configured to:

receive the plurality of TCI states via radio resource control (RRC) signaling including a common TCI state pool including the plurality of TCI states, and further comprising configuring the UE using the common TCI state pool.

9. The UE of claim 7, wherein the computer-executable instructions to apply the full duplex TCI state are further configured to:

generate channel estimation information for the at least two channels or the at least one channel using a reference signal received by the UE; and perform full duplex communications with at least one base station via the channel estimation information.

10. The UE of claim 7, wherein the first transmission link type includes uplink channels and the second transmission link type includes downlink channels.

11. The UE of claim 7, wherein the first transmission link type includes downlink channels and the second transmission link type includes uplink channels.

12. The UE of claim 7, wherein the full duplex TCI state is associated with a qualified full duplex beam pair.

13. A method of wireless communication at a base station, the method comprising:

transmitting, to a user equipment (UE), a plurality of transmission configuration indication (TCI) states, the plurality of TCI states including a full duplex TCI state corresponding to at least two channels for a first transmission link type and at least one channel for a second transmission link type;

transmitting to the UE, within downlink control information (DCI), an indication including an indication identifier that identifies the full duplex TCI state;

receiving an acknowledgment to the DCI from the UE;

determining an application time by adding a predefined amount of slots or time from an end of the acknowledgment to the DCI;

transmitting, to the UE, a reference signal to be measured by the UE to determine channel information for the at least two channels and the at least one channel based on the full duplex TCI state; and applying the full duplex TCI state for full duplex communications with the UE in accordance with the indication identifier and the determined application time.

14. The method of claim 13, wherein the transmitting the plurality of TCI states comprises transmitting radio resource control (RRC) signaling including a common TCI state pool to configure the plurality of TCI states at the UE.

15. The method of claim 13, further comprising:

transmitting a TCI activation including a full duplex TCI state identifier that identifies the full duplex TCI state, the TCI activation activating the full duplex TCI state at the UE before the application time.

16. The method of claim 15, wherein the TCI activation is transmitted via a medium access control-control element (MAC-CE) message.

17. The method of claim 13, wherein the first transmission link type includes uplink channels and the second transmission link type includes downlink channels.

18. The method of claim 13, wherein the first transmission link type includes downlink channels and the second transmission link type includes uplink channels.

19. The method of claim 13, wherein the full duplex TCI state is associated with a qualified full duplex beam pair.

20. A base station for wireless communication, comprising:

a memory storing computer-executable instructions; and at least one processor coupled with the memory and configured to execute the computer-executable instructions to:

transmit, to a user equipment (UE), a plurality of transmission configuration indication (TCI) states, the plurality of TCI states including a full duplex TCI state corresponding to at least two channels for a first transmission link type and at least one channel for a second transmission link type;

transmit to the UE, within downlink control information (DCI), an indication including an indication identifier that identifies the full duplex TCI state;

receive an acknowledgment to the DCI from the UE;

determine an application time by adding a predefined amount of slots or time from an end of the acknowledgment to the DCI;

transmit, to the UE, a reference signal to be measured by the UE to determine channel information for the at least two channels and the at least one channel based on the full duplex TCI state; and apply the full duplex TCI state for full duplex communications with the UE in accordance with the indication identifier and the determined application time.

21. The base station of claim 20, wherein the computer-executable instructions are further configured to:

transmit the plurality of TCI states comprises via radio resource control (RRC) signaling including a common TCI state pool to configure the plurality of TCI states at the UE.

22. The base station of claim 20, wherein the computer-executable instructions are further configured to:

transmit a TCI activation including a full duplex TCI state identifier that identifies the full duplex TCI state, the TCI activation activating the full duplex TCI state at the UE before the application time.

23. The base station of claim 22, wherein the TCI activation is transmitted via a medium access control-control element (MAC-CE) message.

24. The base station of claim 20, wherein the first transmission link type includes uplink channels and the second transmission link type includes downlink channels.

25. The base station of claim 20, wherein the first transmission link type includes downlink channels and the second transmission link type includes uplink channels.

26. The base station of claim 20, wherein the full duplex TCI state is associated with a qualified full duplex beam pair.

* * * * *